(12) United States Patent
Hartley et al.

(10) Patent No.: US 6,889,168 B2
(45) Date of Patent: May 3, 2005

(54) METHOD AND APPARATUS FOR ASSESSING THE SECURITY OF A COMPUTER SYSTEM

(75) Inventors: Bruce V. Hartley, Elbert, CO (US); Eric Knight, Pueblo West, CO (US); Greg Zymbaluk, Colorado Springs, CO (US); Cynthia Mavros, Palmer Lake, CO (US); Kevin Reynolds, Pueblo, CO (US)

(73) Assignee: Innerwall, Inc., Colorado Springs, CO (US)

( * ) Notice: Subject to any disclaimer, the term of this patent is extended or adjusted under 35 U.S.C. 154(b) by 483 days.

(21) Appl. No.: 09/834,334

(22) Filed: Apr. 12, 2001

(65) Prior Publication Data

US 2002/0026591 A1 Feb. 28, 2002

Related U.S. Application Data

(63) Continuation of application No. 09/333,547, filed on Jun. 15, 1999, now abandoned.
(60) Provisional application No. 60/091,270, filed on Jun. 15, 1998.

(51) Int. Cl.[7] .............................................. G06F 12/14
(52) U.S. Cl. ...................................... 702/186; 713/201
(58) Field of Search ................................ 713/200–202; 707/9; 702/186–188

(56) References Cited

U.S. PATENT DOCUMENTS 5,892,943 A    4/1999  Klaus
5,961,644 A   10/1999  Kurtzberg et al.

OTHER PUBLICATIONS

Network Assocates launches CyberCop–Network Intrusion Detection Technology, unattributed, Downloaded from: http://www.nai.com/naicommon/aboutnai/press/pr_template.asp?PR=/PressMedia/021798b.as. . . pp. 1 & 2.

What Satan Is, Extract from a USENET posting date 1995, p. 1. Downloaded from www.fish.com/security.

Designing and Attacking Port Scan Detection Tools, Phwack Magazine, Author "Solar Designer" solar@flse.com (assumed anonymous) vol. 8, issue 53, pps. 1–11.

Titan, Farmer et al., Improving the Security of you Site by Breaking into It. Downloaded from: www.fish.com/security/admin–guide–to–cracking.html, pp. 1–18.

The Ins and Outs of a Network Security Audit, InfoWorld Media Group Inc. 1998, unattributed, pp. 1–3. Downloaded from www.fish.com/titan/lisa–paper.html, pps. 1–12.

Farmer et al., Downloaded from www.fish.com/titan/lisa–paper.html, pps. 1–12.

O'Neil et al., Test Center Comparison, InfoWorld.com, vol. 21, issue 6, pps 1–18.

CyberCop Screen Shot, unattributed. www.softsource.com, pps 1 & 2.

Security, unattributed, www.fish.com/security. Internet Document.

*Primary Examiner*—Patrick Assouad
*Assistant Examiner*—Craig Steven Miller
(74) *Attorney, Agent, or Firm*—Lathrop & Gage LC

(57) ABSTRACT

A method and apparatus performs a security analysis computer system to identify, notify, and possibly correct, vulnerabilities and discrepancies. The security system includes a number of security tools and utilities in order to perform these functions. The security system includes the capability to identify the system configuration and once this is done performs different processes to analyze the computer system directories, locate vulnerabilities in the files or directories, check the network access, do analysis of the users or groups which have access to the computer system and check the permissions which these parties have been granted, and analyze passwords of the users. The utilities include the functionality to permanently remove files from the computer system, mark particular files to be analyzed, as well as schedule the security tests to be performed at predetermined times.

20 Claims, 15 Drawing Sheets

METHOD AND APPARATUS FOR ASSESSING THE SECURITY OF A COMPUTER SYSTEM

This application is a continuation of U.S. application Ser. No. 09/333,547, filed Jun. 15, 1999, now abandoned which claimed benefit from provision application Ser. No. 60/091,270, filed Jun. 15, 1998, now expired.

FIELD OF THE INVENTION

The invention described herein relates to a method and apparatus for analyzing a computer system and identifying security vulnerabilities, and more specifically to a method and apparatus for performing a series of procedures which identify security vulnerabilities and discrepancies in the computer system and in some cases suggesting and implementing corrective action.

BACKGROUND OF THE INVENTION

As the use of computers has grown over the years, especially in business, there has been a growing need to develop computer systems which allow a number of individual computer users to communicate via their computers, and have access to common repositories of data. One solution had been to have all users within an organization connect to a single large main frame computer employing terminals with minimal processing capabilities. Another solution has been the development of server technology which allows a number of individual computer to connect to a central computer, i.e. server, which includes operating systems for a number of core functions for the network such as e-mail, common data bases, as well as a number of functions which are commonly employed by these computers connected to the network.

One advantage of employing server technology is that connections may be established to the server through a number of different modes. A first mode is a direct connection, such as through a local area network (LAN) The second type of connection may be made via a phone line from a remotely located computer. A connection may be established using the public switch telephone network (PSTN) with the server especially adapted to provide a telephonic connection. A third mode is a connection established to the server made over the Internet. With a connection established in this manner, system users browsing the web may access information stored on the server.

With these different modes to establish connections, it may be important to protect the information stored on a server from unauthorized access. Certain protections already exist such as requiring passwords when logging onto the server and restricting access to particular types of information only to designated parties.

SUMMARY OF THE INVENTION

The inventors have recognized that although many computer systems today include certain safeguards, such as passwords, for restricting access to the server and information contained therein, it is possible that these protections may be overcome. The inventors have further recognized that security vulnerabilities in a computer system may be identified and certain procedures may be performed within the computer system to reduce these vulnerabilities.

Described herein is a security system which identifies security vulnerabilities and discrepancies for a computer system. In some cases the security system may suggest corrections or provide fixes for the identified vulnerabilities and discrepancies. The computer system on which the security system resides may include a processor and an operational memory which contains all data which is to be analyzed by the security system described herein. The processor may direct a number of processing modules in the security system which perform various operations with regards to analyzing the computer system. The security system may also include a database which contains portions of data which may be employed by the processing modules in order to perform the various analysis of the computer system.

In one aspect of the invention, the security system includes at least one security module which analyzes files and directories resident in the system memory. The system may further include at least one utility module which may be employed to alert a system user to detected vulnerabilities, and provide corrective suggestions, and then implement the corrections when so directed. Included as part of the security modules may be a configuration detection device which analyzes the system to determine a configuration and located any unusual features. Once the configuration of the computer system has been determined, a directory check module function may be employed which detects security flaws that may have developed in the file system of the computer and determines if any, "security critical" files have been tampered with. A password security module may examine the passwords of the users with access to the computer system to detect insecure password choices. A network check module performs a number of processes to determine the vulnerability of the computer system when access may be gained via a data network.

Another security module may perform an integrity check which searches files in the computer system's operational memory and makes comparison against a store of known vulnerabilities. A user manager module performs an analysis of user accounts with regards to files and directories found in the operational memory. The user check may identify improper or invalid permissions and ownerships, associated with file analyzed therein.

In another aspect of the invention, the system may further comprise a number of utility modules which supplement or otherwise assist the operations of the security modules. The utility modules may include a user manager module which may further include functionality to edit, create or delete user accounts or templates stored in the system memory. A file removal module may provide for the permanent removal of files from the operational memory. A file may be overwritten with a predetermined pattern such that no trace of the file may be identified. A marking module may provide the functionality to manually mark certain files which are deemed to be critical. This marking function enables the directory check to perform an analysis on this particular file to detect tampering when the directory check module is activated.

Further functions may be included in the security system to selectively activate particular tools, schedule the automated performance of functions, or provide reports to the system user in a number of different formats.

Numerous modifications and additions will be apparent to those skilled in the art upon further consideration of the invention.

DESCRIPTION OF PREFERRED EMBODIMENTS

Described herein is an apparatus and method for identifying vulnerabilities and discrepancies in a computer system, and in some situations, suggesting and implementing corrective action. The system disclosed herein is arranged in a modular/integrated form and consists of a number of securities tools and utilities, as well as a number of reporting functions. Each module may test a different aspect of the computer security. The method and apparatus described herein focuses on the internal security of the system, that is, locating security problems that can be detected. The system identifies vulnerable configurations and, in some situations, provides instruction on how to repair particular discrepancies or detected breaches.

Figure 1:
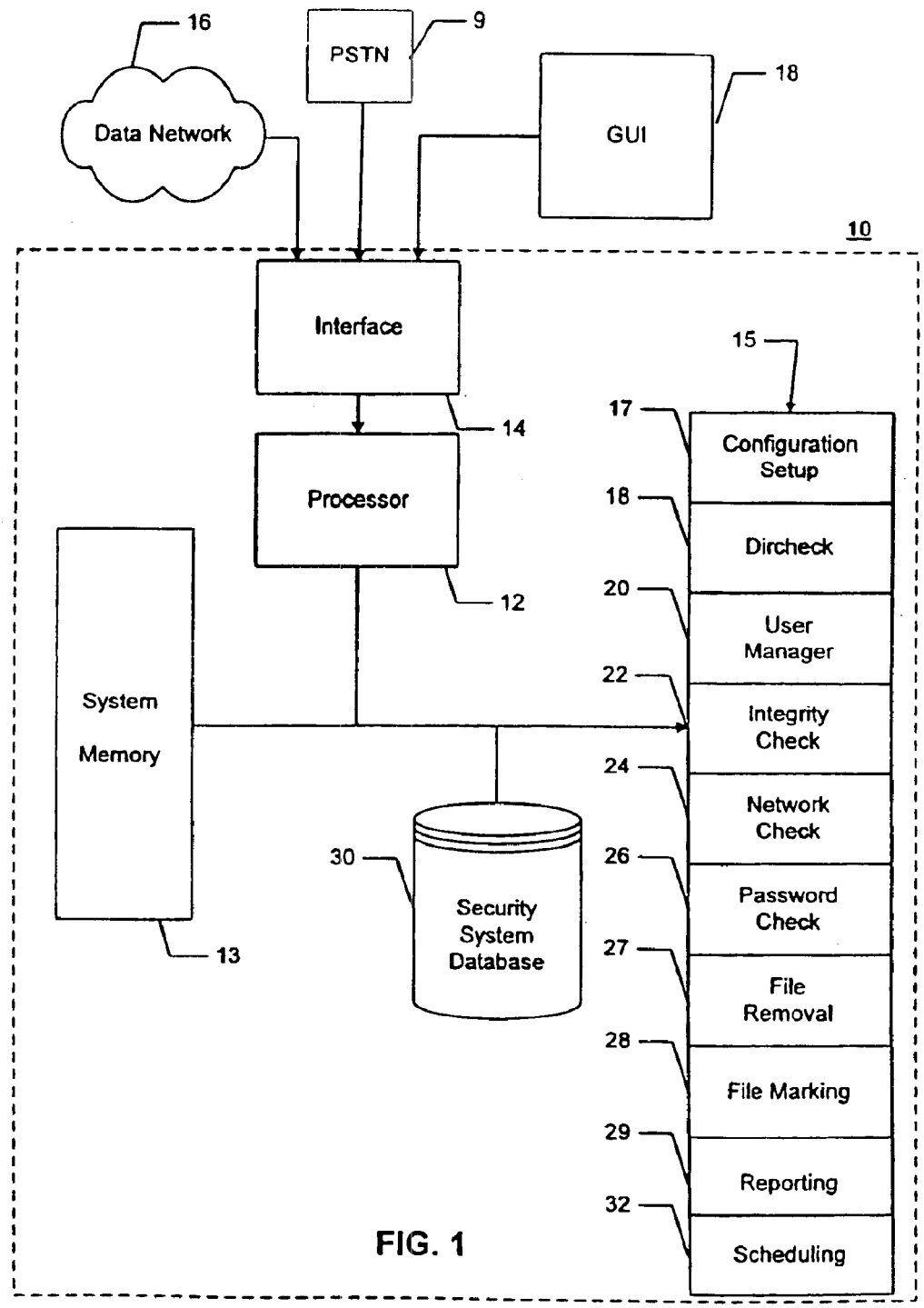
FIG. 1 discloses a system diagram for the security system.

Disclosed in FIG. 1 is a system diagram which describes a computer system within which the system described herein may operate. In one embodiment of the invention, the computer system may be implemented in a server-type computing device, such as a Unix server with connections to a data network. One connection established to the server may be at least one graphical user interface (GUI) 18 as part of a local area network (LAN). Connections may also be remotely established over the public switched telephone network (PSTN) 9 through a modem device incorporated in the server. The server may also include an Internet connection through which users may establish a connection. The security system described herein may be employed by other remotely located servers which are connected via the data network to the server upon which the security system is resident.

Returning to FIG. 1, the server 10 may include a processor 12 which directs the processes performed by the server. In connection with the processor 12 is an interface device 14 which provides connections to PSTN 9, data network 16, and GUI 18. Although only one GUI is disclosed in the figure, one skilled in the art would know that multiple GUI's may be connected to the server as part of the LAN. The interface may further include a modem device for establishing connections over the PSTN.

Also, in connection with the processor 12 is the computer system operational memory 13 which contains all the systems directories and files which the security system will perform security operations upon. Also, in connection with the processor are the processing modules 15 which perform the various security, utility, and administrative functions. These modules will be discussed in greater detail below. Finally, during the performance of the various functions certain information may be required in order to perform these processes. This information is stored in database 30.

As seen in FIG. 1 the security system processing modules 15 comprise a number of security and utility modules for performing a variety of operations with regards to the computer system. The following is a brief discussion of the operation of each module.

In order for the security system to operate on a particular computer system, an analysis of the system must be performed as a preliminary matter. As part of this process, the configuration/setup module 17 identifies files that are "critical" to the computer system and locates any unusual features. This particular module only needs to be operated once upon installation in the computer system. In one aspect of the invention, the configuration/setup module is completely standalone and may not generate a report.

Figure 2:
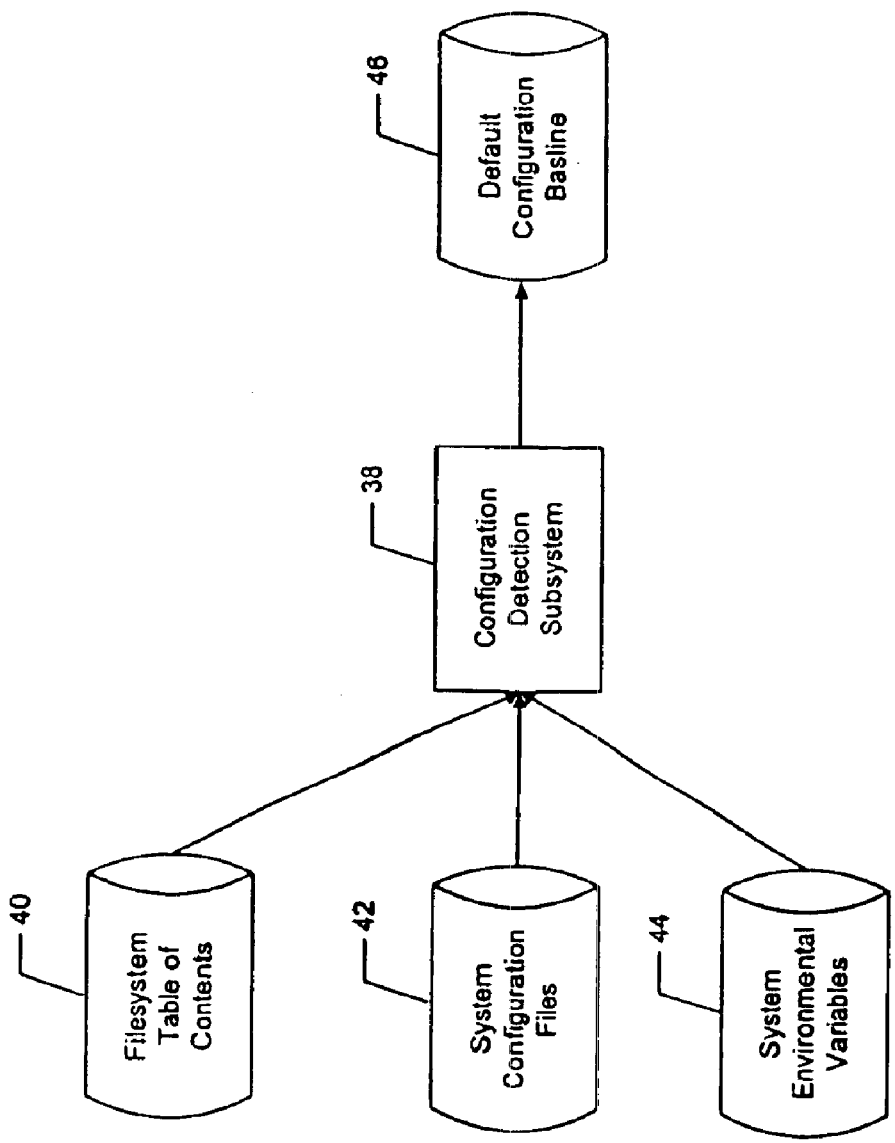
FIG. 2 discloses a system diagram for the configuration detection subsystem.

Disclosed in FIG. 2 is a system diagram for the configuration/setup module in which the configuration detection subsystem 38, which is a component of the configuration/setup module, accesses a number of files in the system memory, such as the file system table of contents 40, the system configuration files 42, and the system environmental variables 44. Based on the information accessed, a configuration baseline 46 is generated stored in memory such that it may then be employed by the other modules of the security system.

During operation of the security system, the directory checker module 18 searches for computer flaws that develop in the file system of a computer over a period of time and detects if "security critical" files have been tampered with. When a particular security problem is identified, the system administrator for the server is prompted for a quick fix, and if the program is capable of providing one, all the information associated with security problems, both corrected and uncorrected, is then forwarded to a reporting module for the security system. Certain things that the directory check module searches for include: globally read/writable directories, executable files that can be globally modified, protected files that have changed permission, newly created files, protected files that have changed ownership or group, protected files that have been deleted, protected files that have been tampered with, incorrect device driver permissions, tamper device driver permissions, incorrect device ownership, and insecure permissions or ownership of an operating system files.

Figure 3:
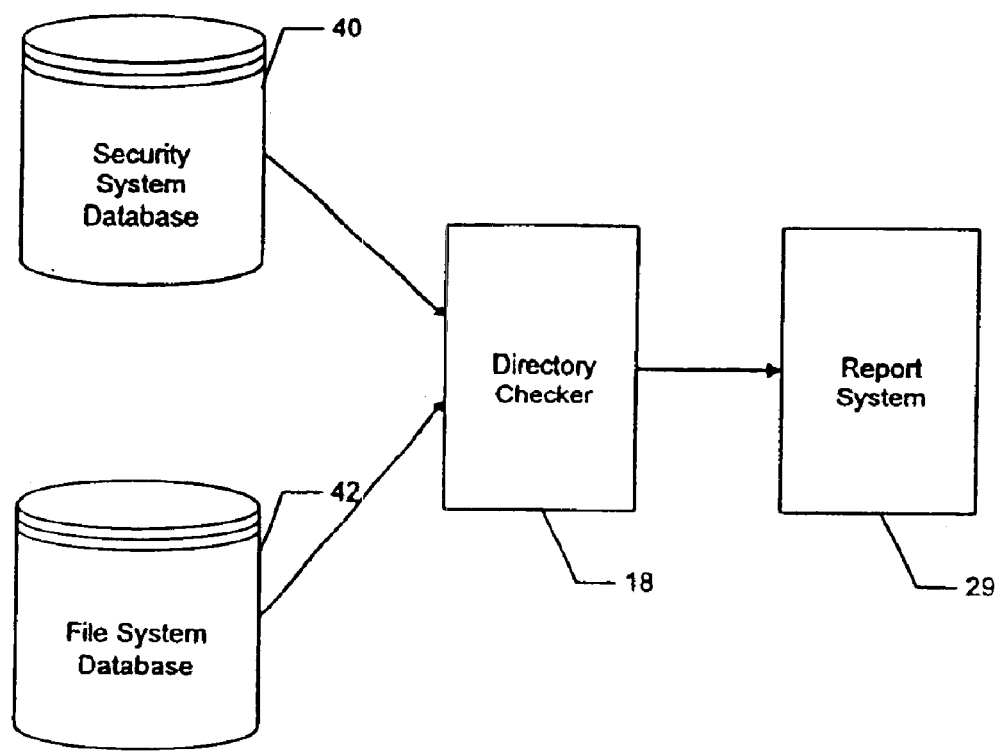
FIG. 3 discloses a system diagram for the directory checker module.

Disclosed in FIG. 3 is a system diagram for the directory check module 18. The directory check module receives data from two sources. The first being the security system database 30 and the second being file system database 42, which is a listing of files and directories in the system memory including pertinent information relating file or directory ownership, group ownership, and times in which any changes were made to the file or directory. Upon completion of the analysis, a report may be issued via report module 29.

The directory check module may also examine individual file permissions for nonstandard configurations. System files are compared against the database of suggested permissions for these files. If the files on the computer differ from files in the database, a prompt may be generated to change the files' rights to those suggested by the security system.

The user manager module 20 is employed to identify improper or invalid permissions and ownerships associated with files. The module identifies common misconfigurations and provides reports as to any anomalies detected. The user manager further provides the capability to provide easy access to user account creation, creation of multiple groups, and system wide searches for user account vulnerabilities. The features performed by the module include creation of new accounts, creation of new user groups, searching of home directories for improper ownership, searching for nonexistent home directories, searching home directories for improper groups, and searching home directories for improper or insecure files related to some users.

Figure 4:
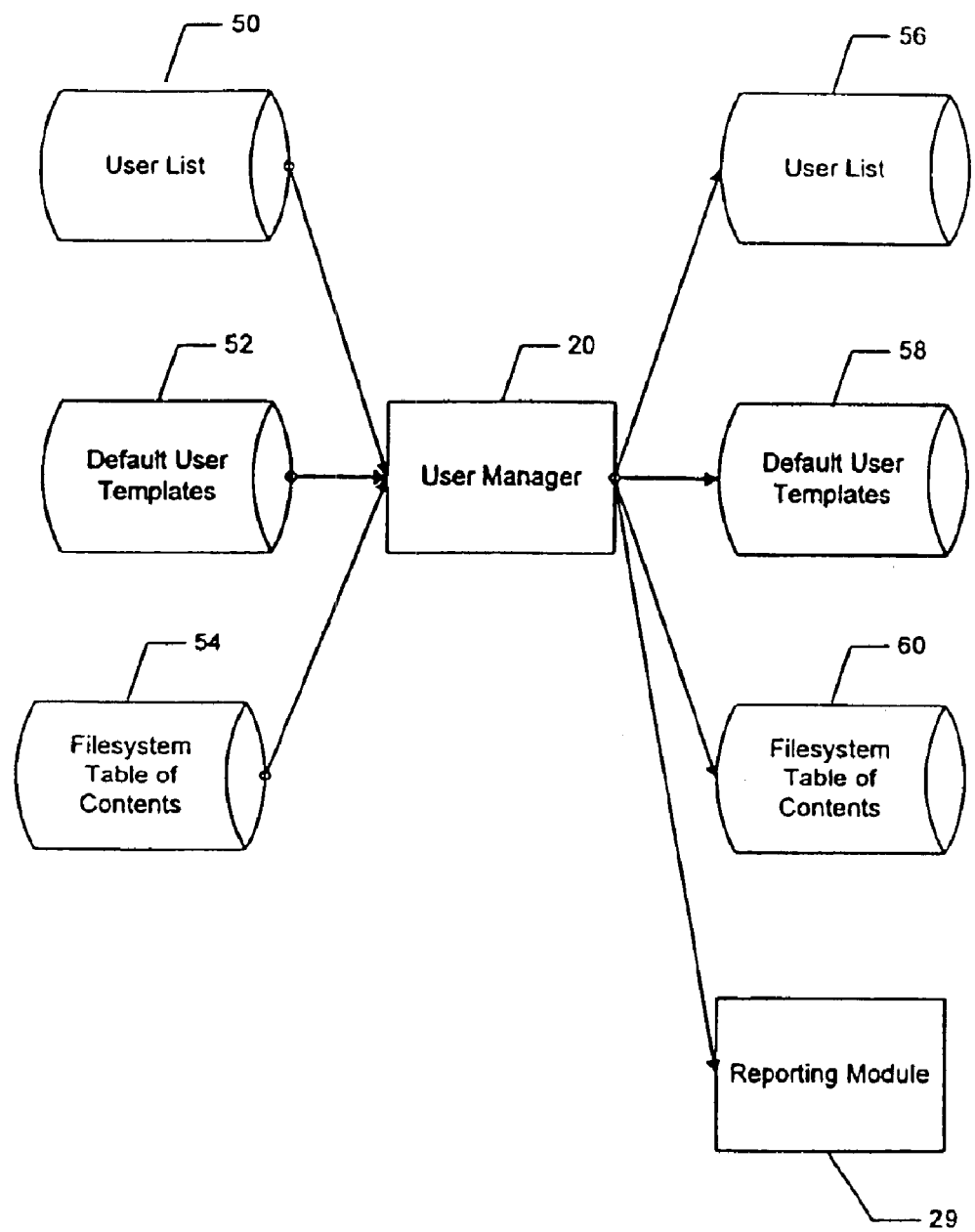
FIG. 4 discloses a system diagram for the user manager module.

A system diagram for the user manager 20, is disclosed in FIG. 4. In order to perform its functions, the user manager accesses to a number of different databases. One database is the user list 50. This list contains a list of all users currently having permission to access the computer system. The default users template 52 contains all of the permissions given to the particular users to access particular files within the system. The file system table of contents 54 includes a listing of all files in the systems with permissions which are granted to each.

The user manager includes the capability to create new user accounts or user groups, as well as make amendments to user templates and file system table of contents. User list 56, default user template 58 and file system table of contents 60, are all updated versions of these items following the procedures performed by the user manager. Any items worth noting during the processes performed by the user manager are output via the reporting system 29.

The integrity checker module 22 performs an analysis of the computer system in order to find security holes located therein. The analysis performed may find vulnerabilities in such things as: the type of computer/operating system used, the access privileges of files, the owner of the files, the group of the files, the date of the files, or a version number for a send mail program. This integrity checker module may provide such items as file name, nature of security hole, and where a system administrator may locate additional information on the particular problems detected. The integrity check module 22 searches for pre-existing security problems by cross-referencing against a vulnerability database which is stored in local memory.

Figure 5:
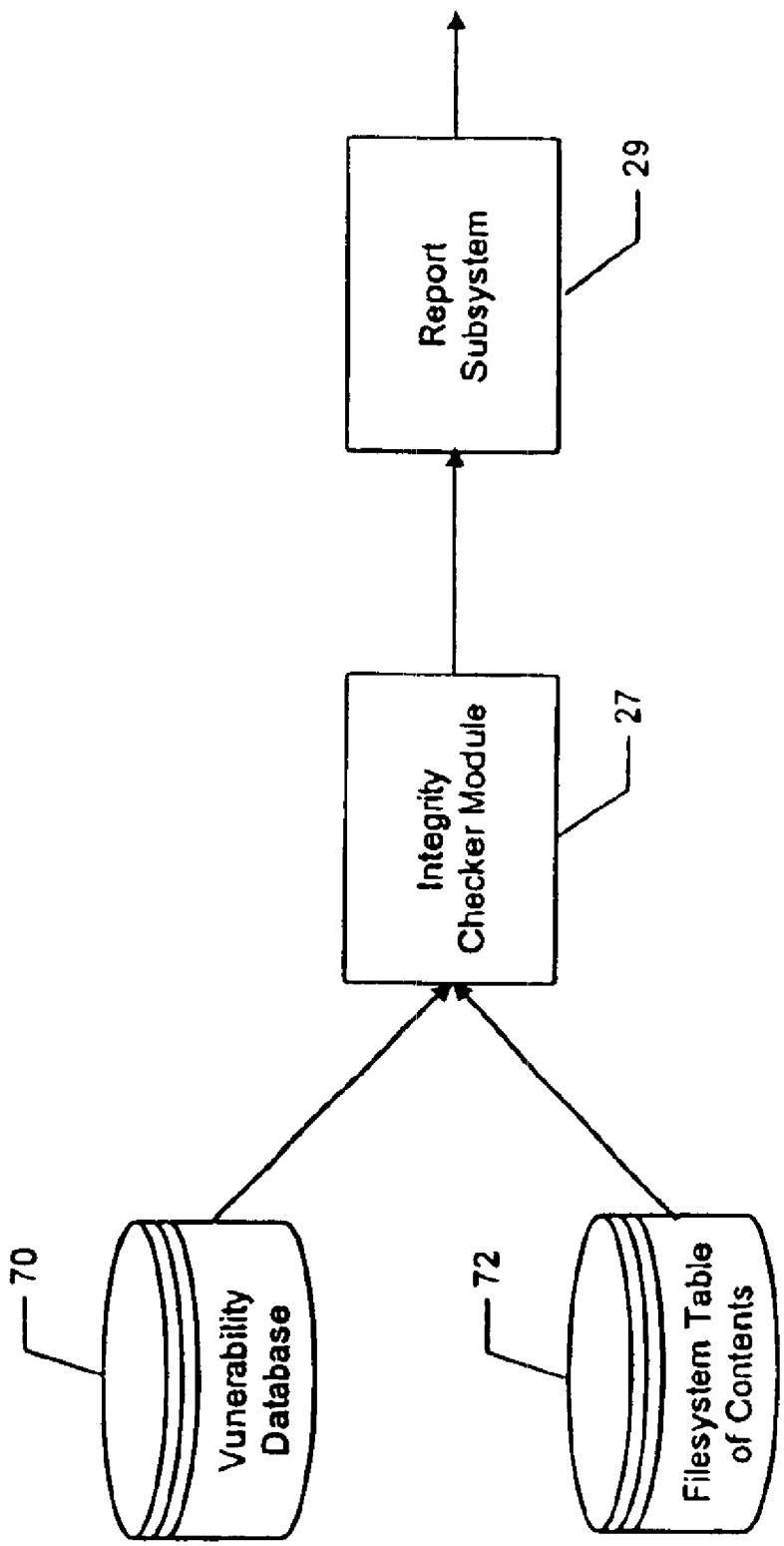
FIG. 5 discloses a system diagram for the integrity check subsystem.

Disclosed in FIG. 5 is a system diagram which includes the data stores accessed by the integrity check module 22. As described above, the integrity check module is employed to analyze the computer system and identify vulnerabilities and discrepancies. Data to be analyzed is retrieved from the file system table of contents 72 which includes a listing of files to be analyzed. Also in connection with the integrity module is the vulnerability database 70 which includes a listing of potential vulnerabilities. Items contained in the vulnerability database which are employed when analyzing a filed, may relate to age, owner, permissions, existence and group. Any vulnerabilities or discrepancies detected during the process are output via the report subsystem 29.

The network check module 24 performs various analysis to detect vulnerabilities which may occur due to a computer or server being connected to a network. The checks which may be performed include: checking vulnerable configuration files, detecting excessive system services, and checking for promiscuous mode operations on the network interface. The network check may display all services running on the network and include those not registered with the Internet Daemon.

Figure 6:
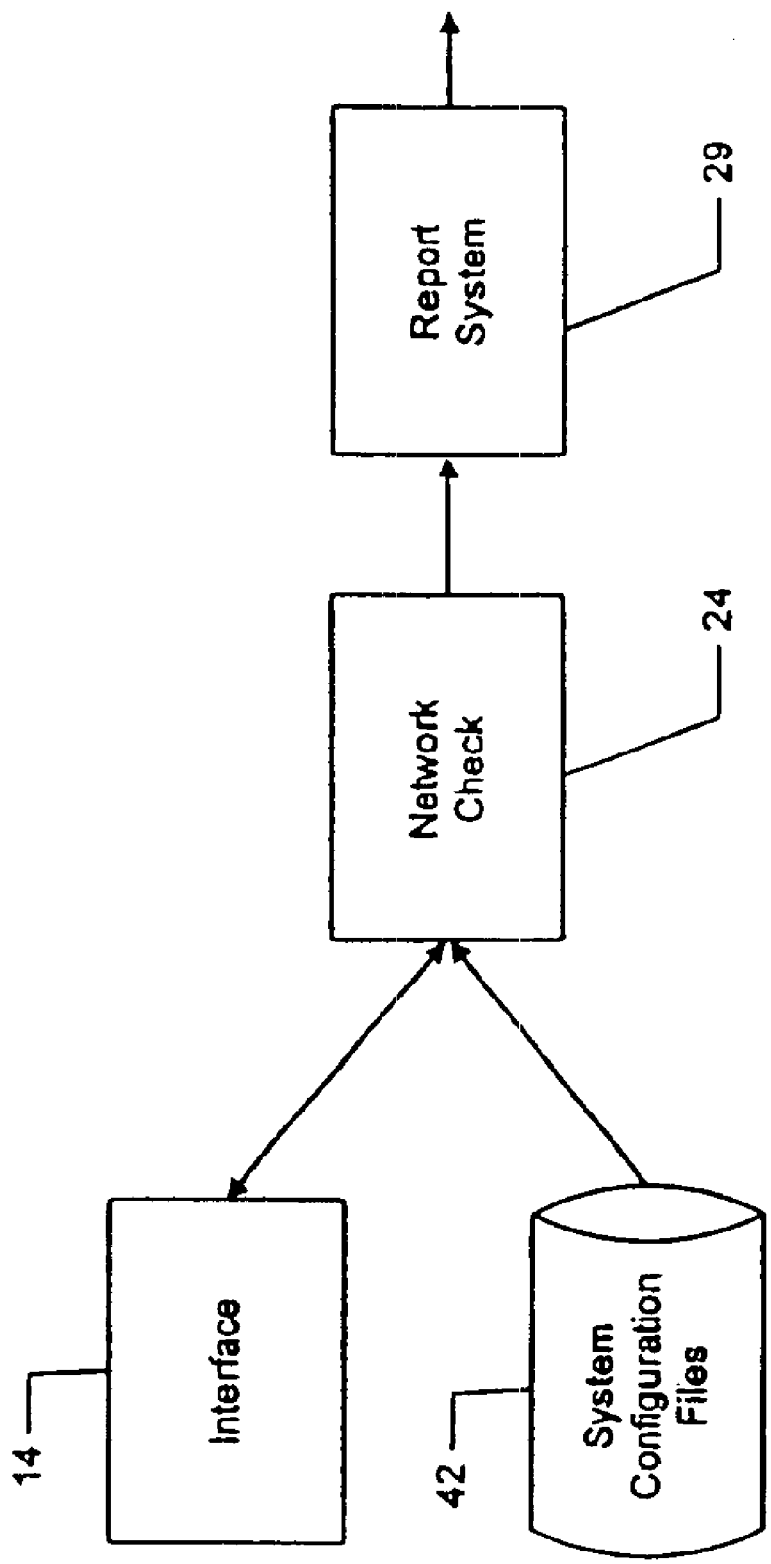
FIG. 6 discloses a system diagram for the network check module.

Disclosed in FIG. 6 is a system diagram which includes the elements of the system accessed by the network check module. In order to check the vulnerability of the configuration files, access is gained to the system configuration files 42. In order to check other system characteristics such as promiscuous mode operations, the operations of the network interface 14 are analyzed. The identification of excessive system services may be determined through analysis of a number of components such as the network interface, the processor, and a number of different files stored in memory. Upon completion of the above-described processes, a report may be issued to the system through employment of reporting system 29.

The password checking module 26 is employed to examine DES-encrypted passwords associated with each user to locate weak password choices or those easily guessed. This tool may be employed to test the strength of a system front end security, as weak passwords can easily compromise the system. The password checking module may perform such functions as "same salting," integration of "similar salts," filtering of words to generate pseudo words often used as passwords, GCOC password guessing to determine the technique used by the system administrator when handing out new accounts, and large common nonrepetitive dictionaries so that multiple dictionaries that don't contain duplicate words can used for testing.

Figure 7:
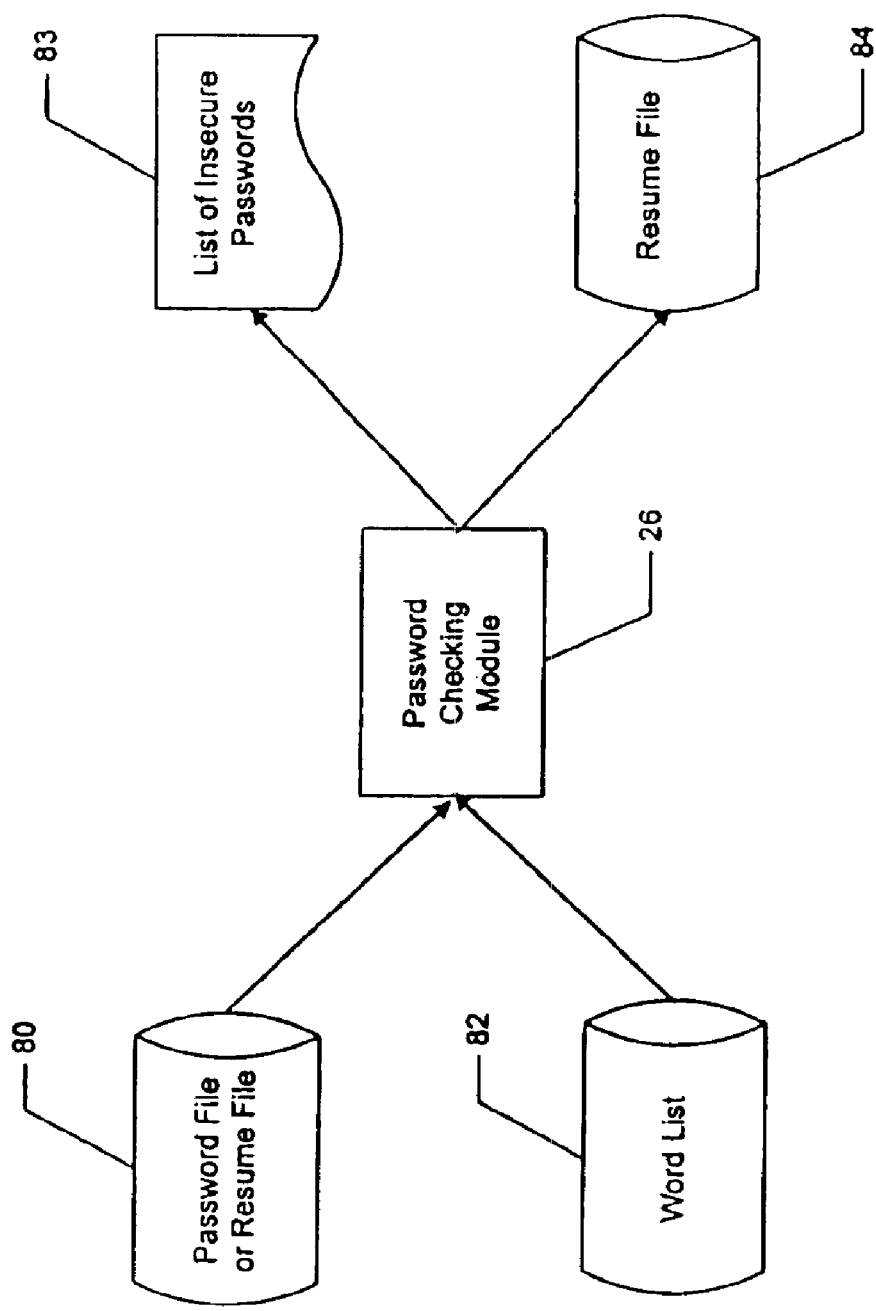
FIG. 7 discloses a system diagram for the password checking module.

A system diagram for the password checking module is shown in FIG. 7. The module receives data input from two sources. The first is the password file or resume file 80 which contains all passwords for the users in the system. The second data input is from the word list 82 which includes all of the information to be employed by the password checking module including dictionaries. Output from the module is a list of insecure passwords 83 which are identified from the analysis, as well as a resume file 84.

The remaining processing modules relate to performing various utility and administrative functions. Under the direction of system user, various files and directories in system memory may be identified and through the use of the modules various functions performed with regards to these items. The user manager 20, may be employed to generate, delete, or edit user or group directories. Further, the user manager may provide specifics for a selected user, such as user name, UID, group name, GCOC's s-field, home directory, shell, and password. The user manager templates can be used to create user accounts for users who share common requirements on a system.

The file removal module 27 provides functionality to permanently delete selected files. This is accomplished by overwriting the file with bit patterns and text multiple times and then verifying that the information has been changed. This particular function provides the ability to delete individual or groups of files.

The file marking module 28 provides the functionality to manually mark a file which may be critical to the computer system. Through employment of the configuration directory check module described above, certain files may be designated as critical to the system. If there are other files in the system that are critical but not identified as such, then the file marking utility may be employed to mark those files. This causes the file to be checked by the directory check module each time it is run. If the directory check module detects tampering in a marked file, it will be shown in a report for that particular run of the system. This utility may also be employed to unmark files previously marked.

The reporting module 29 provides the functionality to display to a system user, the vulnerabilities and other items generated by the security system. After modules have performed particular functions, reports may be generated which can then be presented to system user via the GUI.

The schedule module 32 provides the functionality to run security checks at predetermined intervals. Checks can be scheduled to run at specific designated times as well as at regular intervals such as monthly or weekly. The schedule module further provides the flexibility to run individual security modules or all tests.

In operation, the security system is initially installed on the computer system. After installation, the configuration setup module 17 will run and perform an evaluation of the computer system. Once this evaluation is complete, this information is stored in memory, and the other modules may be accessed and their functions performed.

In order for the system to perform the functions described herein, a number of different system users interaction devices may be employed. As a first example, a series of screen displays may be presented through the GUI which a system user may interact with in order to activate or deactivate particular functions. Further, options may be provided through the GUI to run individual modules of the system, on all security modules, schedule the operation of the modules, and to receive input from the system user during the operation of the security system. For example, disclosed in FIG. 7 is an example of a screen display which may be employed to activate the individual modules of the security system.

As can be seen in the display graphic 90, three separate interface buttons are provided so that a system user may select the modules that will be employed in the analysis of the system. For example, if security button 92 is pressed, the selections enclosed in the dialogue box 98 are presented. As can be seen, these include the directory check, password check, network check, integrity check, and user check functions. User may select the processes to be performed and through selection of the execute button 100 execute these selected functions.

In a situation where the utilities button 96 is selected from the display graphic 90, the file removal and file marking options will be presented to the system user. Upon selection of the reports section button 94, the system user may then initiate the performance of reporting or scheduling functions.

Figure 9:
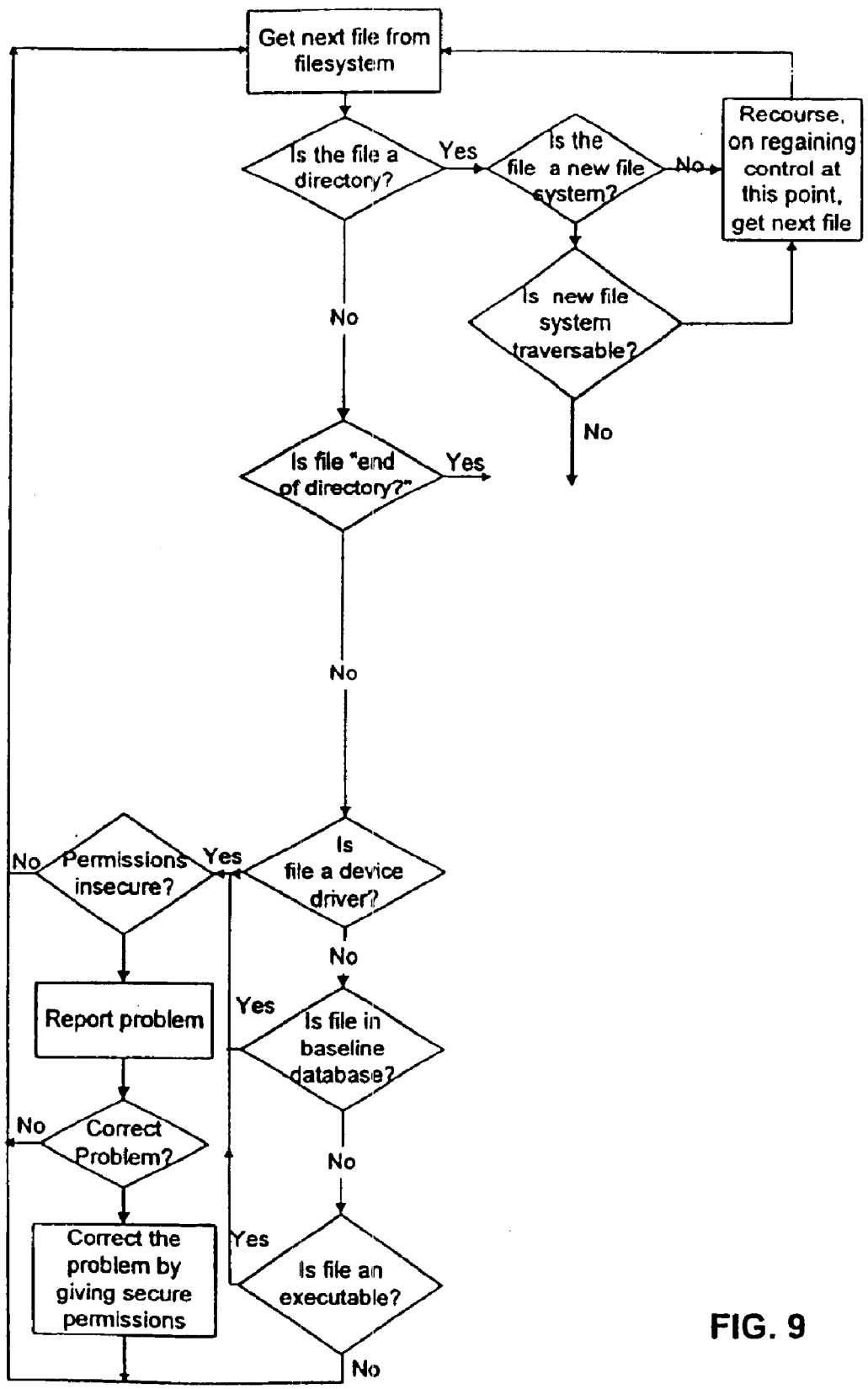
FIG. 9 discloses a flow chart which describes the operation of the directory checker module.

If the security button is chosen, the system user may then choose any of the security functions. For example, if the directory check function is chosen in dialogue box 98, the directory check module 18 is initiated in the system and the steps disclosed in the flowchart of FIG. 9 are performed.

Once the directory check process has been initiated, the first step is to access files in the file system database. Files selected are typically used files residing in a public binary executable directory or common directories where insecurities may exist. The first step in the process is to access the first file in the file system. At this point, a query is made as to whether the file is a directory or not. If the file is a directory, further queries are made as to whether the file is a new file system, and if so, whether it is traversable. If the answer as is yes to both queries the directory is accessed and the files contained therein may be analyzed. If the new file system is not accessible, the function is terminated. If it is first determined that the directory is an old file system it is accessed and the files contained therein are analyzed.

If the file is not a directory, a query is made as to whether the file is "end of directory". If so, the function is terminated. If the file is not an end of directory, a query is made as to whether the file is a device driver, in the baseline database, or is an executable file. If the answer is "no" to all these queries, this portion of the process is terminated and the next file in sequence is accessed. If a "yes" is determined for any of the queries, an analysis is then performed as to whether the permissions for the file are secure. As was described above, the tests performed include identification of: globally read/writable directories, executable files that can be globally modified, protected files that have changed permission, newly created files, protected files that have changed ownership or group, protected files that have been deleted, protected files that have been tampered with, incorrect device driver permissions, tamper device driver permissions, incorrect device ownership, and insecure permissions or ownership of an operating system files.

If an insecure permission is detected, the system then may provide a report. Depending on the permission problem detected, the system may provide the opportunity to correct it. These corrections are included as part of the security system database. If permission is given to make the correction to the system, the correction is performed and the process returns to the next file in the file system.

Figure 10:
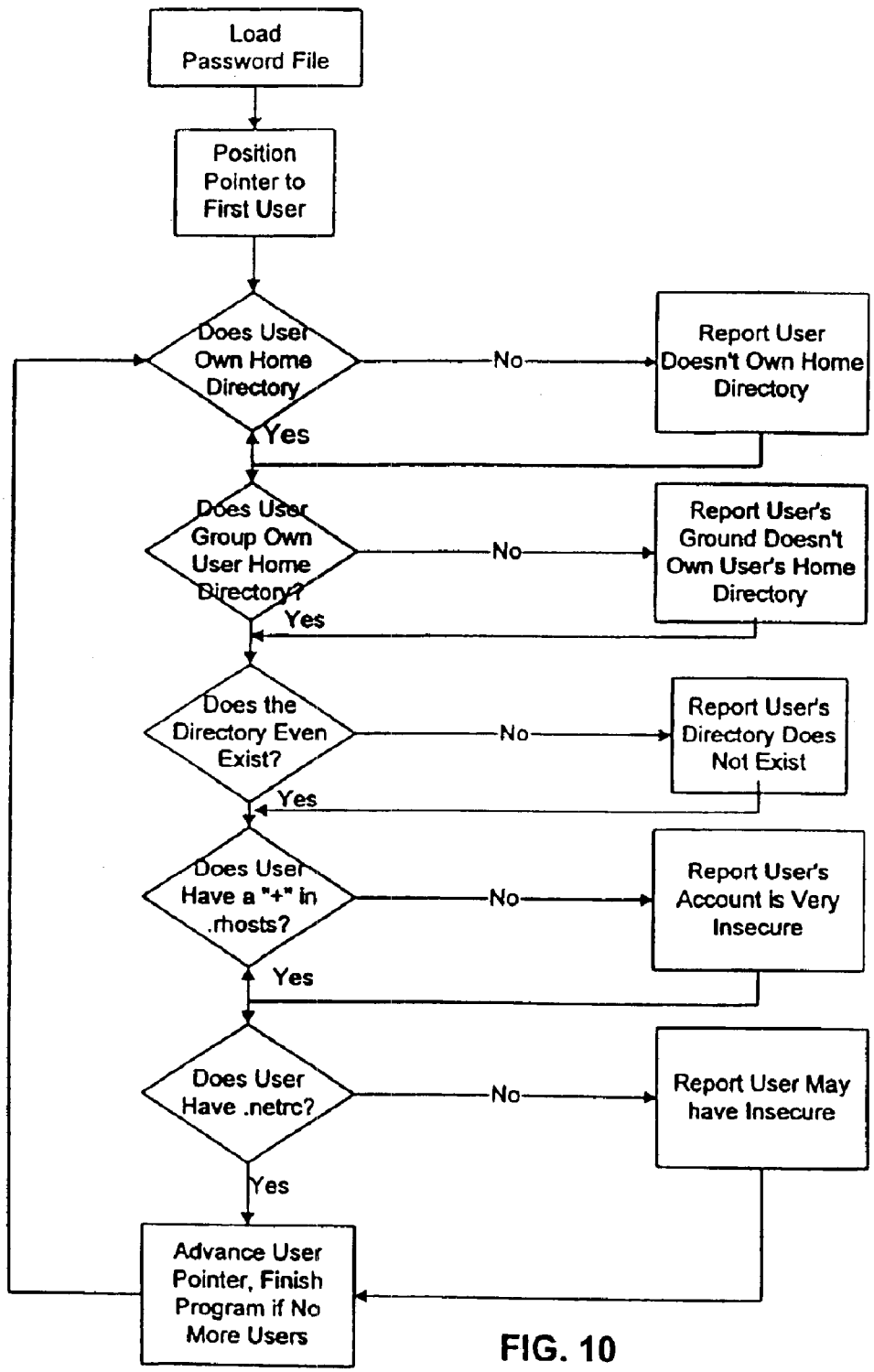
FIG. 10 discloses a flow chart which describes the operation of the user manager module.

If the system users wishes to initiate the user check function, the steps disclosed in the flow or chart FIG. 10 are performed. In the initial step, the password file for a the users is first loaded. At this point, the first user on the list is identified. Within the computer system, users may be assigned a home directory in which all files related to or created by the particular user may be stored. A query is first made as to whether the user owns the home directory. If the user does not own the home directory, a report is generated and the process moves on to the next step. A query is then made as to whether the work group to which the user is affiliated owns the home directory. If it is detected that the user's group does not own the home directory to which the user is associated, a report is generated.

In the next step, an analysis is made to determine if the home directory for the user even exists. If this directory does not exist, a report is issued. In the next two steps, an analysis is made as to certain aspects of the user's account and access to the system. In either case, if the permissions provided to the user are found to be insecure, reports are issued. Once the analysis of the particular user is complete, the process returns to the top and the next user on the list is analyzed.

Figure 11:
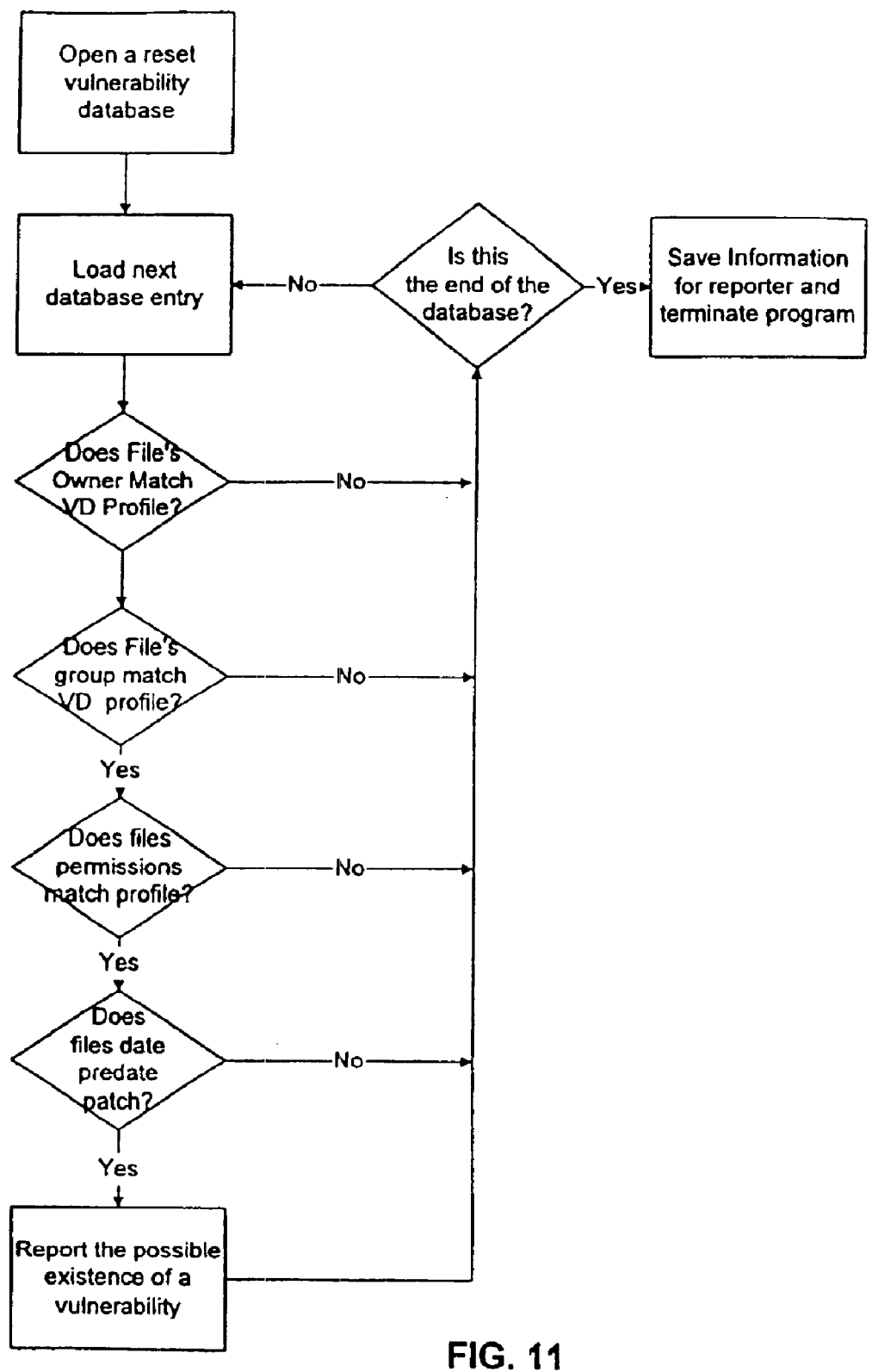
FIG. 11 discloses a flow diagram which describes the operation of the integrity check module.

Disclosed in FIG. 11 is a flow chart which describes the operation of the integrity checker, when selected by the system user or otherwise automatically initiated. The first step in the process is to load the vulnerability database which contains a listing of possible vulnerabilities or discrepancies. The first file from the computer system database is then loaded and the analysis is begun. A first query made is to whether the detected owner of the file matches a predetermined profile. If not, this discrepancy is noted and the next entry in the database is loaded. If the response is yes, in the next step a query is made as to whether the file's group matches a predetermined profile. If not, the next entry in the database is loaded. If the answer is yes, a query is then made as to whether the file permissions match the profile. If they don't, this is noted and the next entry in the database is loaded. But if they do match, a query is made in the final step as to whether the file date predates a match. If the answer is no, the next entry in the database is loaded. If the answer is yes, a report is generated regarding the possible existence of a vulnerability. At the completion of the analysis of the database, a report is generated which lists all discrepancies or vulnerabilities which were noted.

Figure 12:
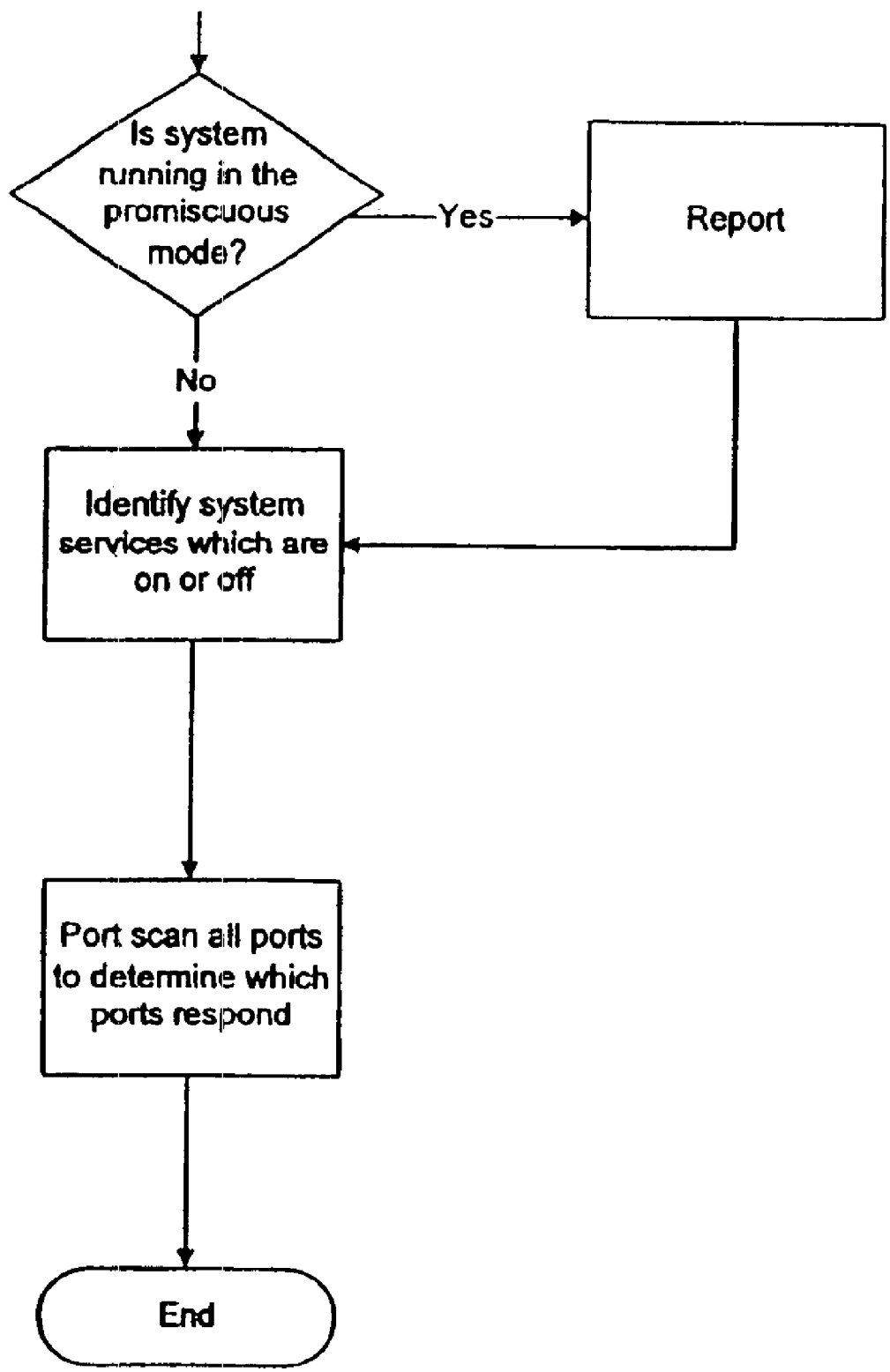
FIG. 12 discloses a flow chart which describes the operation of the network check module.

Disclosed in FIG. 12 is a flow chart which describes the operation of the network checking module when selected by the system user or otherwise automatically initialized. This module is employed to check for vulnerabilities which may occur due to the connection of a server or computer to a data network such as a LAN or the worldwide network. In the first step, an analysis is performed to determine if the system is running in the promiscuous mode. This mode allows the machine to see all network packets transmitted in the network, rather than just those packets destined for the machine. If it is, a report is generated. In the next step, an analysis is performed of the various configuration files to note any insecurities. In the final step, a portscan is performed on all or a designated number of network access ports. Upon completion, a report may be generated and provided.

Figure 13:
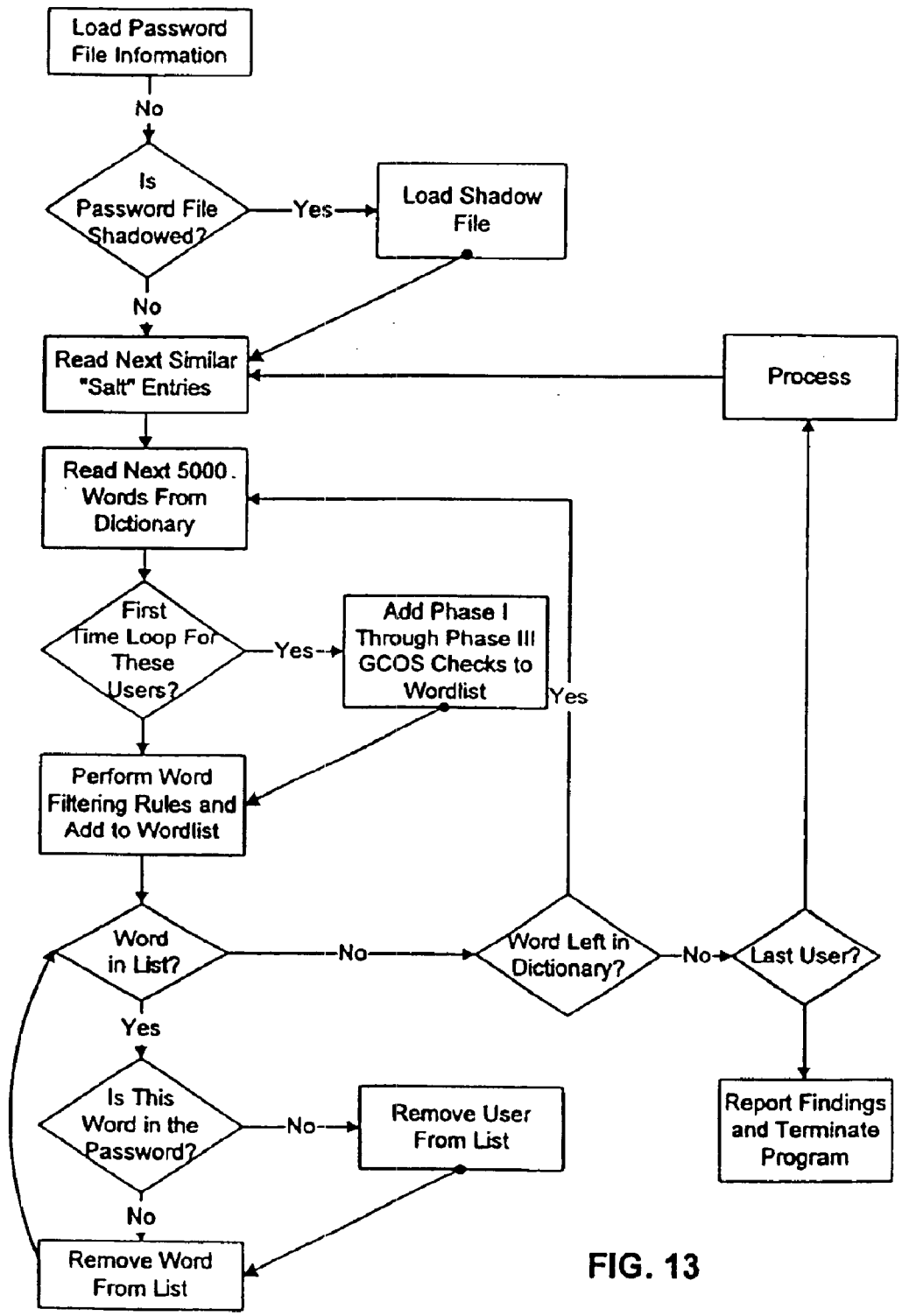
FIG. 13 discloses a flow chart which describes the operation of the password checking module.

Disclosed in FIG. 13 is a flow chart which describes the operation of the password checking module when selected by the system user or otherwise automatically initiated. In the initial step the password information is loaded from the computer system working memory. A query is made as to whether the password file is shadowed, and if so, this file is loaded as well. In the next step, similar salt entries are read from the dictionary stored in the system. The system employs "same salting" so that there will only be a single "salt" attempt per dictionary. After a similar salt entry is chosen, the next 5,000 words from the dictionary are also read. If this is the password's first entry through the system, the GCOS password guessing process is also performed. A word filtering process is then performed to generate pseudowords that are often used as passwords. Once this process is performed, a query is made as to whether the password is in the list of words generated above. If the word is in the list, a query is made as to whether the word from the list is in the password. If the word is in the password, the user is removed from the list. If the word is not in the password, the word is removed from the list.

Once a word is removed from the list, a query is made as to whether there are any words left in the dictionary to employ for the analysis. If yes, the above process is then performed for the words that are left. If the answer is no, it is determined that the password is uncrackable according to the processes described above and a query is made as to whether this is the last user to be analyzed. If the answer is no, then word list is reset to the beginning.

With regards to activating the utility modules, button 94 in the screen display of FIG. 4 may be selected by a system user. Upon selection of this button, a listing of the utilities modules is provided. The system user may then select one or more utility modules to run.

Figure 14:
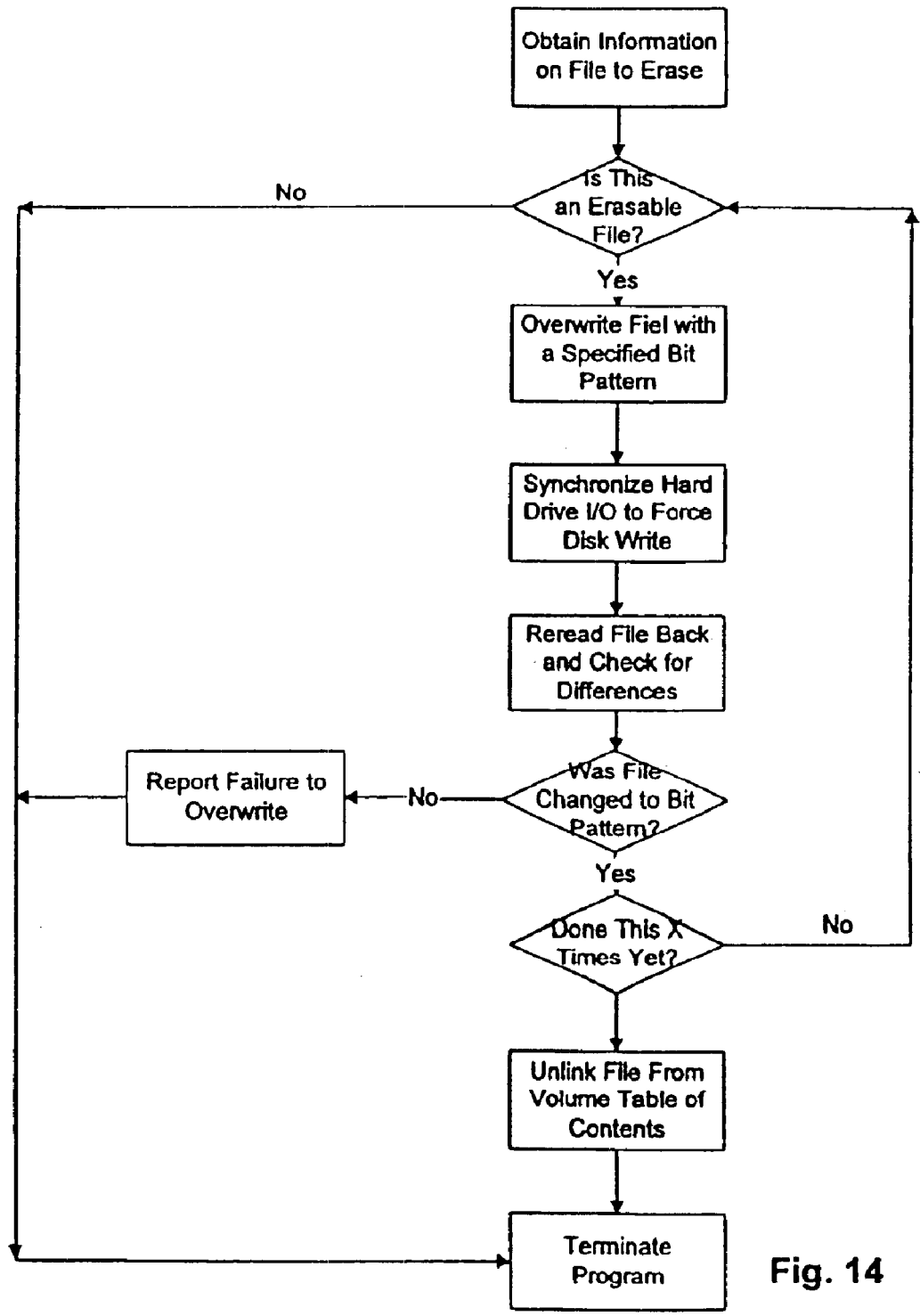
FIG. 14 discloses a flow chart which describes the operation of the file removal module.
Figure 15:
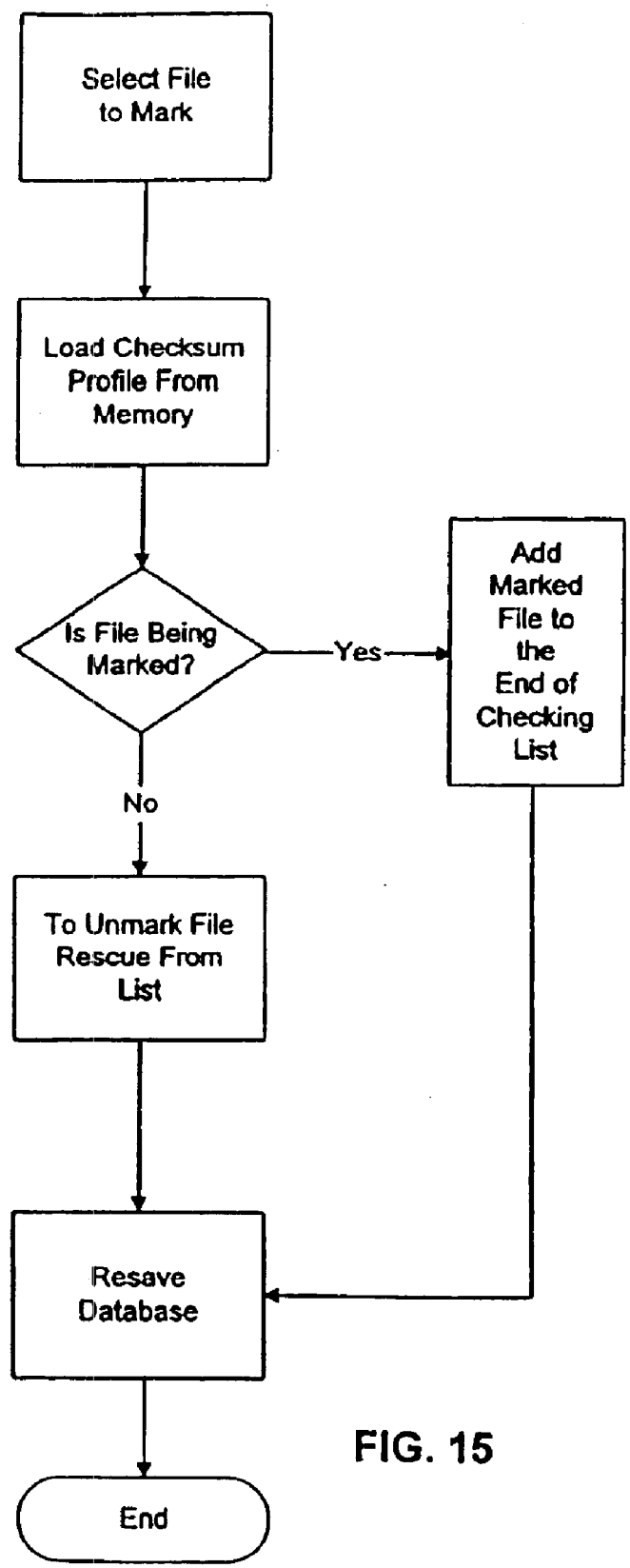
FIG. 15 discloses a flow chart which describes the operation of the file marking module.

Disclosed in FIG. 14 is a flow chart which describes the operation of the file removal module 27. As described above, this module provides the ability to completely delete selected files so that they are not recoverable. Once a file has been identified for removal by the system user, the file removal process may be initiated. The system user may select a file or files to be deleted by viewing a directory listing on the display screen. Once a file has been selected, an analysis is performed to determine whether this is a file which may be erased. For example if the file passed to the removal module isn't a direct filename (i.e., it contains ".." or "." as a path, possibly to fool the system into wiping out a device instead of a file), the file removal module will not erase the file. If the file is not erasable, the program is terminated.

If it is determined that the file is overwritable, the module then overwrites the file with a specified bit pattern. For example, this pattern may be "0101". Once this is complete, the file system is synchronized in order to force data to be written to the drive. The file is reread back to check for differences. At this point a query is made as to whether the file has changed to the designated bit pattern. If not, a report failure to override is provided. If the override was successful, this process may then be repeated a number of times with different bit patterns. This file may then be overridden with text such as "the quick brown fox jumps over the lazy dog" in order to simulate "non-sensitive" information. The final step in the process is to unlink the file from the volume table of contents. At this point the program may be terminated.

Disclosed in FIG. 13 is a flow diagram which describes the operation of the file marking module 28 when selected by the system user. As was described above this utility is employed when a file is determined to be critical but is not otherwise marked by one of the security functions. This utility also includes the functionality to unmark files. In the first step the file is selected from memory. As with the file removal module, the system user may view a directory and make selections. The database of the host's security checksum is then loaded. If a file is to be marked, the marked file is added to the end of the checksum file. If it is to be removed, it removed from the database. The database is then resaved.

Also, as part of the utility modules, a system user may schedule the performance of any of the functions performed by the security modules or the utility modules. Upon the selection of a schedule option, a variety of further screens may be presented which provide the system user the choices of one or more modules scheduled, the date which the functions will be performed and the time during the dates which they will be performed. Further options may be provided such as periodic activation of the functions, one time activations of the functions, or the combination of various security and utility modules.

Figure 8:
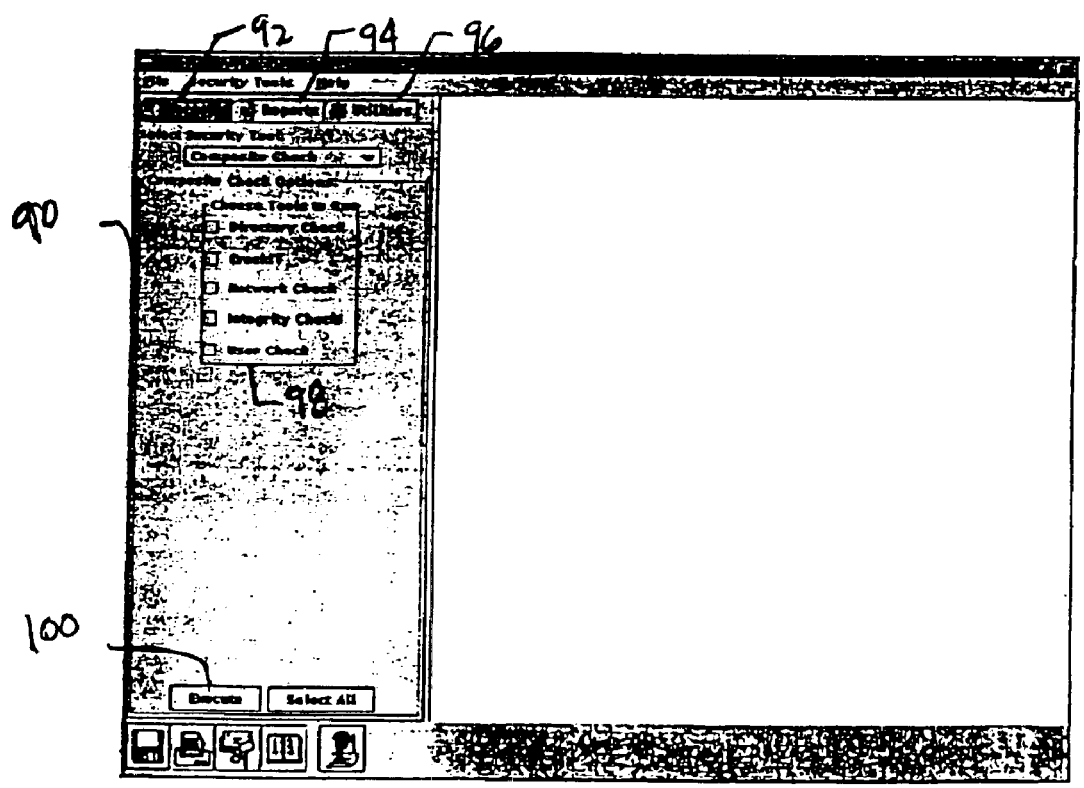
FIG. 8 discloses a display graphic presentable on the GUI.

Returning again to FIG. 8, if the system user selects the reports button 94, at least one option is provided. A first option may be to generate reports for any individual security module, or a combination of modules. An option may also be provided for archiving and accessing archive reports. In the situation where a system user is to generate a report, certain options may be provided through the graphical interface, as to the format of the reports. The system user may also be provided the opportunity to edit and print reports.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A security system for a computer apparatus, wherein said computer apparatus includes a processor and system memory, said security system comprising:

at least one security module which under direction from the processor accesses and analyzes selected portions of the computer apparatus to identify vulnerabilities;

at least one utility module which under the direction from the processor, performs various utility functions with regards to the computer apparatus in response to the identified vulnerabilities; and a security system memory which contains security information for performing the analysis of the computer apparatus.

2. The security system of claim 1 further including at least one graphical user interface in connection with the computer apparatus through which a system user may direct operations of the security system.

3. The security system of claim 2 further including a reporting module which provides status information to the GUI with regards to operations of the security system.

4. The security system of claim 2 wherein the computer apparatus comprises a Unix server.

5. The security system of claim 4 wherein the server is connected to a data network.

6. The security system of claim 2 wherein a plurality of interface screens are presented at the GUI for controlling operations of the security system.

7. The security system of claim 1 wherein the security modules include at least one of:

a configuration/system module which performs an initial analysis of the computer system to acquire configuration information;

a directory checking module which analyzes directories and files in the system memory to determine if security critical files have been tampered with;

a user manager module which analyzes the system memory with regards to improper or invalid permissions given to users of the system for accessing particular files;

an integrity checking module which analyzes files in the system memory to identify system vulnerabilities;

a network checking module which analyzes the computer apparatus to identify vulnerabilities created as a result of the computer apparatus connecting with a data network; and a password checking module which analyzes passwords for users of the computer apparatus to identify vulnerabilities.

8. The security system of claim 7 wherein the utilities modules include at least one of:

said user manager module which includes functionality to perform at least one of: create a user account, modify the user account, delete the user account, create a user template, edit the user template, and delete the user template;

a file removal module which deletes selected files from the system memory and removes links to the deleted file;

a file marking module which marks selected files; and a scheduling module which may be employed to schedule any and all of the security modules to perform analysis of the system memory.

9. The security system of claim 7 wherein the system memory comprises a list of known vulnerabilities which may be employed by the integrity checking module.

10. The security system of claim 7 wherein the system memory comprises dictionaries and other tools employed by the password checking module.

11. A method of providing a security assessment for a computer system which includes a system memory, comprising the steps of:

providing a security subsystem in the computer system such that functionality of the security subsystem is directed through a processor for the computer system, wherein the security performs steps comprising:

identifying a configuration of the system;

accessing the system memory and performing at least one procedure to provide a security assessment for at least one aspect of the computer system;

as a result of any vulnerabilities discovered in the assessment, identifying corrective measures to be taken with regards to the computer system;

reporting the discovered vulnerability and the identified corrective measures; and upon receiving an appropriate command, initiating the corrective measures.

12. The method of claim 11 wherein the step of performing at least one procedure to provide a security assessment includes at least one of:

performing an analysis of the directories and files in the system memory to determine if security critical files have been tampered with;

analyzing the system memory with regards to improper or invalid permission given to users of the system for accessing particular files;

analyzing the system memory to identify system vulnerabilities;

analyzing the computer apparatus to identify vulnerabilities created as a result of the computer apparatus connecting to a data network; and analyzing passwords for users of the computer apparatus to identify vulnerabilities.

13. The method of claim 12 wherein based on the identified vulnerabilities at least one of the following steps are performed:

amending, deleting, or creating user accounts;

amending, deleting, or creating user templates;

deleting selected files from the system memory and removing links to said file; and marking of selected files within the system memory.

14. The method of claim 12 wherein the method of analyzing directories and files comprises the steps of:

accessing individual files in the system memory;

identifying the type of file contained therein;

making a determination as to whether the permissions for the identified file are secure;

if the permissions are not secure, providing a report describing the insecurity;

providing corrections for the detected files which are insecure; and initializing corrective action upon receiving direction.

15. The method of claim 12 wherein the step of analyzing the system memory with regards to improper or invalid permissions given to users further comprises the steps of:

performing a check to see if a user owns his or her home directory;

performing a check to see if the user's group owns the home directory;

performing a check to see if user related files are valid; and performing a check to see if the user's directory exists.

16. The method of claim 12 wherein the step of analyzing files in the system memory to identify system vulnerabilities further comprises the steps of:
  providing a vulnerability database which includes a number of identified system vulnerabilities;
  accessing the individual files in the system memory;
  determining whether the file's owner matches a predetermined profile;
  determining whether the file's group matches a predetermined profile;
  determining whether the permissions associated with the file match a predetermined profile; and
  determining whether the files predate a patch; and
  providing a report on any vulnerabilities which may exist in the system memory.

17. The method of claim 12 wherein the step of analyzing the computer apparatus to identify vulnerabilities traded as a result of the computer apparatus connecting with the data network÷further comprises the steps of:
  checking for insecure configuration files;
  checking running of excessive system services; and
  checking whether the computer system is running in the promiscuous mode.

18. The method of claim 12 wherein the step of analyzing passwords further comprises the steps of:
  identifying all passwords for the users of the computer system;
  reading the passwords and for each identifying a next similar salt entry;
  identifying a next predetermined number of words from the dictionary;
  performing a word filtering method with regards to the passwords to add to the word list;
  determining whether the word is in the list; and
  if the word is in the list, removing the user from the list.

19. The method of claim 11 further comprising the step of displaying a result of the security analysis via a graphical user interface.

20. The method of claim 11 wherein the computer system is connected to a data network.

* * * * *

UNITED STATES PATENT AND TRADEMARK OFFICE
CERTIFICATE OF CORRECTION

PATENT NO. : 6,889,168 B2
APPLICATION NO. : 09/834334
DATED : May 3, 2005
INVENTOR(S) : Bruce V. Hartley et al.

It is certified that error appears in the above-identified patent and that said Letters Patent is hereby corrected as shown below:

Column 13, line 20, the words "network÷further" should read --network further--

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

PATENT NO.        : 6,889,168 B2
APPLICATION NO.   : 09/834334
DATED             : May 3, 2005
INVENTOR(S)       : Bruce V. Hartley et al.

It is certified that error appears in the above-identified patent and that said Letters Patent is hereby corrected as shown below:

In the Claims:

Claim 11, Column 12, line 7, "the security performs" should read --the security subsystem performs--

Signed and Sealed this
Twenty-seventh Day of August, 2013

Teresa Stanek Rea
*Acting Director of the United States Patent and Trademark Office*